US011539887B2

(12) United States Patent
Li et al.

(10) Patent No.: US 11,539,887 B2
(45) Date of Patent: Dec. 27, 2022

(54) VIDEO IMAGE ANTI-SHAKE METHOD AND TERMINAL

(71) Applicant: HUAWEI TECHNOLOGIES CO., LTD., Shenzhen (CN)

(72) Inventors: Yuanyou Li, Shanghai (CN); Wei Luo, Shanghai (CN); Huanyu Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 16/976,820

(22) PCT Filed: Mar. 23, 2018

(86) PCT No.: PCT/CN2018/080357
§ 371 (c)(1),
(2) Date: Aug. 31, 2020

(87) PCT Pub. No.: WO2019/178872
PCT Pub. Date: Sep. 26, 2019

(65) Prior Publication Data
US 2020/0404178 A1 Dec. 24, 2020

(51) Int. Cl.
*H04N 5/232* (2006.01)
*G06T 7/70* (2017.01)
(Continued)

(52) U.S. Cl.
CPC ......... *H04N 5/23258* (2013.01); *G06T 5/006* (2013.01); *G06T 7/70* (2017.01);
(Continued)

(58) Field of Classification Search
CPC ................ H04N 5/23258; H04N 5/23267
See application file for complete search history.

(56) References Cited

U.S. PATENT DOCUMENTS 6,751,410 B1    6/2004 Stavely
7,057,645 B1 *  6/2006 Hara .................. G03B 5/00
                                                382/294
(Continued)

FOREIGN PATENT DOCUMENTS

CN    103685950 A    3/2014
CN    104796596 A    7/2015
(Continued)

*Primary Examiner* — John Villecco
(74) *Attorney, Agent, or Firm* — Maier & Maier, PLLC

(57) ABSTRACT

This application discloses a video image anti-shake method and a terminal, and relates to the field of image processing, to implement compensation for translational shake in a Z direction. A video image anti-shake method includes: turning on, by a terminal, a camera lens, and photographing a video image by using the camera lens; detecting, by the terminal, shake on an X-axis, a Y-axis, and a Z-axis during photographing, where the Z-axis is an optical axis of the camera lens, the X-axis is an axis perpendicular to the Z-axis on a horizontal plane, and the Y-axis is an axis perpendicular to the Z-axis on a vertical plane; and performing, by the terminal, anti-shake processing on the video image based on the shake on the X-axis, the Y-axis, and the Z-axis. Embodiments of this application are applied to video image anti-shake.

17 Claims, 12 Drawing Sheets

(51) Int. Cl.
*G06T 5/00* (2006.01)
*H04N 5/225* (2006.01)

(52) U.S. Cl.
CPC ....... *H04N 5/2253* (2013.01); *H04N 5/23254* (2013.01); *H04N 5/23267* (2013.01); *H04N 5/23296* (2013.01); *H04N 5/232121* (2018.08); *G06T 2207/10016* (2013.01); *G06T 2207/10028* (2013.01); *G06T 2207/20132* (2013.01)

(56) References Cited

U.S. PATENT DOCUMENTS

| | | | | |
|---|---|---|---|---|
| 10,142,546 | B2* | 11/2018 | Ito | H04N 5/23258 |
| 10,341,562 | B1* | 7/2019 | Cotoros | H04N 13/122 |
| 10,609,288 | B1* | 3/2020 | Kulik | H04N 5/23267 |
| 10,681,277 | B1* | 6/2020 | Kulik | H04N 5/2329 |
| 11,003,054 | B2* | 5/2021 | Kabasawa | G03B 7/091 |
| 11,283,999 | B2* | 3/2022 | Kulik | H04N 5/3532 |
| 2011/0001858 | A1 | 1/2011 | Shintani et al. | |
| 2011/0234825 | A1 | 9/2011 | Liu et al. | |
| 2012/0038783 | A1 | 2/2012 | Noto et al. | |
| 2012/0293674 | A1 | 11/2012 | Uenaka | |
| 2014/0184836 | A1* | 7/2014 | Watanabe | H04N 5/23254 348/208.5 |
| 2014/0184837 | A1* | 7/2014 | Shibata | H04N 5/23267 348/208.6 |
| 2015/0085149 | A1* | 3/2015 | Tsubaki | H04N 5/23287 348/208.4 |
| 2016/0269639 | A1* | 9/2016 | Chang | H04N 5/23267 |
| 2017/0034410 | A1 | 2/2017 | Yoo et al. | |
| 2017/0078577 | A1* | 3/2017 | Wakamatsu | H04N 5/23287 |
| 2017/0244881 | A1 | 8/2017 | Stec | |
| 2017/0244900 | A1* | 8/2017 | Ito | H04N 5/23258 |
| 2017/0272658 | A1 | 9/2017 | Ito | |
| 2018/0046063 | A1 | 2/2018 | Sharma | |
| 2019/0331983 | A1* | 10/2019 | Kabasawa | G01P 15/12 |
| 2020/0120282 | A1* | 4/2020 | Guo | H04N 5/23254 |
| 2020/0288061 | A1* | 9/2020 | Grenet | H04N 5/23258 |

FOREIGN PATENT DOCUMENTS

| | | | |
|---|---|---|---|
| CN | 104902142 | A | 9/2015 |
| CN | 104967785 | A * | 10/2015 |
| CN | 104967785 | A | 10/2015 |
| CN | 105100614 | A | 11/2015 |
| CN | 105430245 | A | 3/2016 |
| CN | 106488081 | A | 3/2017 |
| CN | 106791423 | A | 5/2017 |
| EP | 1 619 882 | A2 | 1/2006 |
| JP | 2002116476 | A * | 4/2002 |
| JP | 2003043540 | A * | 2/2003 |
| JP | 2003207813 | A * | 7/2003 |
| JP | 2003209736 | A * | 7/2003 |
| JP | 2012112819 | A | 6/2012 |
| JP | 2016061912 | A | 4/2016 |
| RU | 2384967 | C1 | 3/2010 |
| RU | 2517347 | C1 | 5/2014 |

* cited by examiner

Roll

Translational shake or focus adjustment on a Z-axis

Yaw

Translational shake on an X-axis

Pitch

Translational shake on a Y-axis

Normal image
 Image after shaking
 Image shake direction
 Compensation direction

VIDEO IMAGE ANTI-SHAKE METHOD AND TERMINAL

CROSS-REFERENCE TO RELATED APPLICATIONS

This application is a national stage of International Application No. PCT/CN2018/080357, filed on Mar. 23, 2018, which is incorporated herein by reference in its entirety.

TECHNICAL FIELD

This application relates to the field of image processing, and in particular, to a video image anti-shake method and a terminal.

BACKGROUND

When a user takes a photo during movement or holds and shakes a phone during photographing, the captured photo or video may be blurred due to shaking. To resolve an image shake problem, optical image stabilization (OIS) technology and electronics image stabilization (EIS) technology may be employed. In the OIS technology, during photographing, a motion sensor detects shake data of a photographing device, and an OIS controller controls and drives, based on the shake data, an OIS motor to move a lens or an image sensor. However, because the photographing device may continuously shake or move, even if the OIS technology is used, obvious shake and misplacement will still exist between several consecutive frames of images.

The EIS technology includes two manners of operation. One manner is image-content-based anti-shake processing: a motion situation of the image is identified based on content of a previous image frame and a next image frame, and suitable processing such as cropping, stretching, and deformation are performed after registration and alignment are performed on the image. A disadvantage of this method is a large calculation requirement, a low speed, and high power consumption. The other manner is to perform anti-shake processing based on motion sensor data: the motion sensor data during exposure of each frame of the image is used to calculate a motion situation between frames, and suitable processing such as cropping, stretching, and deformation is performed after registration and alignment are performed on the image. This method features a high speed and low power consumption.

Referring to FIG. 1, currently, a second EIS technology can only compensate for five-axis direction shake including three types of rotation motions: pitch, yaw, and roll, and translational shake on an X-axis and a Y-axis. The compensation for the translational shake on a Z-axis has not been implemented. The Z-axis is an optical axis of a camera lens, the X-axis is an axis perpendicular to the Z-axis on a horizontal plane, the Y-axis is an axis perpendicular to the Z-axis on a vertical plane, the roll is rotation around the Z-axis, the pitch is rotation around the X-axis, and the yaw is rotation around the Y-axis.

SUMMARY

Embodiments of this application provide a video image anti-shake method and a terminal device, to implement compensation for translational shake on a Z direction.

To achieve the foregoing objective, the following technical solutions are used in the embodiments of this application.

According to a first aspect, a video image anti-shake method is provided, where the method includes: turning on, by a terminal, a camera lens, and photographing a video image by using the camera lens; detecting, by the terminal, shake on an X-axis, a Y-axis, and a Z-axis during photographing, where the Z-axis is an optical axis of the camera lens, the X-axis is an axis perpendicular to the Z-axis on a horizontal plane, and the Y-axis is an axis perpendicular to the Z-axis on a vertical plane; and performing, by the terminal, anti-shake processing on the video image based on the shake on the X-axis, the Y-axis, and the Z-axis. According to the video image anti-shake method provided in this application, compensation may not only be implemented for the translational shake of the terminal on the Z-axis, but a more accurate X/Y translational shake anti-shake effect is also implemented by using object distance detection. In addition, an image zooming amount caused by focus adjustment is calculated by detecting a location of the lens, so that the image is stabilized during the focus adjustment through reverse zooming.

In a possible implementation, the method further includes: detecting, by the terminal, an object distance, where the object distance is a distance to a focused object or person, and where detecting, by the terminal, shake on an X-axis, a Y-axis, and a Z-axis includes: if the object distance is greater than and equal to an object distance threshold, detecting, by the terminal, rotation shake on the X-axis, the Y-axis, and the Z-axis; or if the object distance is less than an object distance threshold, detecting, by the terminal, rotation shake on the X-axis, the Y-axis, and the Z-axis, and detecting, by the terminal, translational shake on the X-axis, the Y-axis, and the Z-axis. In this implementation, if the object distance is greater than and equal to the object distance threshold, the terminal may only detect the rotation shake (three-axis video anti-shake) of the terminal on the X-axis, the Y-axis, and the Z-axis, in this way, a data volume may be reduced, a data processing speed may be improved, and power consumption may be reduced; and if the object distance is less than the object distance threshold, the terminal may detect the rotation shake and translational shake (six-axis video anti-shake) of the terminal on the X-axis, the Y-axis, and the Z-axis, in this way, a relatively good anti-shake effect may be implemented.

In a possible implementation, detecting, by the terminal, an object distance includes: detecting, by the terminal, the object distance by using a depth sensor, where the depth sensor includes at least one of the following sensors: a laser sensor, a time of flight (time of flight, TOF) sensor, and a structured light sensor. This implementation provides a sensor for detecting the object distance.

In a possible implementation, detecting, by the terminal, rotation shake on the X-axis, the Y-axis, and the Z-axis includes: detecting, by the terminal, the rotation shake on the X-axis, the Y-axis, and the Z-axis by using an angle sensor, where the angle sensor includes a gyroscope. This implementation provides a sensor for detecting the rotation shake on the X-axis, the Y-axis, and the Z-axis.

In a possible implementation, detecting, by the terminal, translational shake on the X-axis, the Y-axis, and the Z-axis includes: detecting, by the terminal, the translational shake on the X-axis, the Y-axis, and the Z-axis by using a displacement sensor, where the displacement sensor includes an accelerometer. This implementation manner provides a sensor for detecting the translational shake on the X-axis, the Y-axis, and the Z-axis.

In a possible implementation, the method further includes: detecting, by the terminal, an image distance, where performing, by the terminal, anti-shake processing on the video image based on the shake on the X-axis, the Y-axis, and the Z-axis includes: performing, by the terminal, anti-shake processing on the video image based on the object distance, the image distance, and the shake on the X-axis, the Y-axis, and the Z-axis. In this implementation, the six-axis anti-shake may further be compensated by using the object distance and the image distance.

In a possible implementation, detecting, by the terminal, an image distance includes: detecting, by the terminal, the image distance by using a location sensor, where the location sensor includes at least one of the following sensors: a Hall effect sensor, an anisotropic magneto resistance (AMR) sensor, a giant magneto resistance (GMR) sensor, and a tunneling magneto resistance (TMR) sensor. This implementation provides a sensor for detecting the image distance.

In a possible implementation, performing, by the terminal, anti-shake processing on the video image based on the object distance, the image distance, and the shake on the X-axis, the Y-axis, and the Z-axis includes: for image shake caused by rotation of the terminal around the Z-axis, performing, by the terminal, rotation compensation on the video image in an opposite direction of the rotation and at a same angle of the rotation; for image shake caused by rotation shake of the terminal around the X-axis or rotation shake around the Y-axis, performing, by the terminal based on a formula $d=v*\tan(\theta)$, compensation on the video image with a same translation distance d in an opposite direction of translation of the video image, and restoring trapezoidal distortion of the video image to a rectangle in a rotation axis direction based on a trapezoidal correction algorithm, where d is an image displacement distance, v is the image distance, and $\theta$ is an angle of rotation around the X-axis or the Y-axis; for image shake caused by the translational shake of the terminal on the X-axis or the Y-axis, performing, based on a formula $d=(v+u)*\Delta/v$, compensation on the video image with a same translation distance d in an opposite direction of translation of the video image, and cropping a redundant part of the video image, where d is an image displacement distance, v is the image distance, u is the object distance, and $\Delta$ is a translation distance of the terminal; and for image shake caused by the translational shake of the terminal on the Z-axis, zoom the video image based on a zoom ratio $(u+\Delta)/u$, where u is the object distance, and $\Delta$ is a translation distance of the terminal in a direction away from an object on the Z-axis. This implementation provides a specific manner of further compensating for the six-axis anti-shake by using the object distance and the image distance.

In a possible implementation, the method further includes: for image shake caused by focus adjustment of the terminal, zooming, by the terminal, the video image based on a zoom ratio $[(u-\Delta)v]/[(v+\Delta)u]$, where u is the object distance, v is the image distance, and $\Delta$ is a distance by which a lens moves towards the object. In this implementation, the image shake caused by the focus adjustment may be supplemented.

According to a second aspect, a terminal is provided, including: a photographing unit, configured to turn on a camera lens and photograph a video image by using the camera lens; a detection unit, configured to detect shake on an X-axis, a Y-axis, and a Z-axis during photographing, where the Z-axis is an optical axis of the camera lens, the X-axis is an axis perpendicular to the Z-axis on a horizontal plane, and the Y-axis is an axis perpendicular to the Z-axis on a vertical plane; an anti-shake unit, configured to perform anti-shake processing on the video image based on the shake on the X-axis, the Y-axis, and the Z-axis. Based on a same inventive concept, for a problem-resolving principle and beneficial effects of the terminal, refer to the first aspect, the possible method implementations of the first aspect, and brought beneficial effects. Therefore, for implementation of the terminal, refer to the first aspect and the possible method implementations of the first aspect. Details are not repeated.

According to a third aspect, an embodiment of this application provides a terminal, including: a processor, a memory, and a communications interface; where the memory is configured to store a computer executable instruction, the processor is coupled to the memory, and when the terminal is run, the processor executes the computer executable instruction stored in the memory, so that the terminal performs the method according to the first aspect and possible implementations of the first aspect.

According to a fourth aspect, an embodiment of this application provides a computer-readable storage medium, the computer-readable storage medium stores an instruction, and when the instruction is run on any one of the foregoing terminals, the terminal is enabled to perform the method according to the first aspect providing possible implementations of the first method.

According to a fifth aspect, an embodiment of this application provides a computer program product including an instruction, and when the computer program product is run on any one of the foregoing terminals, the terminal is enabled to perform the method according to the first aspect and possible implementations of the first aspect.

In the embodiments of this application, names of components in the foregoing terminal do not constitute a limitation on devices. During actual implementation, the components may exist with other names Provided that functions of the components are similar to those in the embodiments of this application, the components fall within the scope of the claims of this application and equivalent technologies thereof.

In addition, for a technical effect brought by any design manner in the third aspect to the fifth aspect, refer to the technical effects brought by the different design manners in the foregoing first aspect. Details are not described herein again.

DESCRIPTION OF EMBODIMENTS

Figure 1:
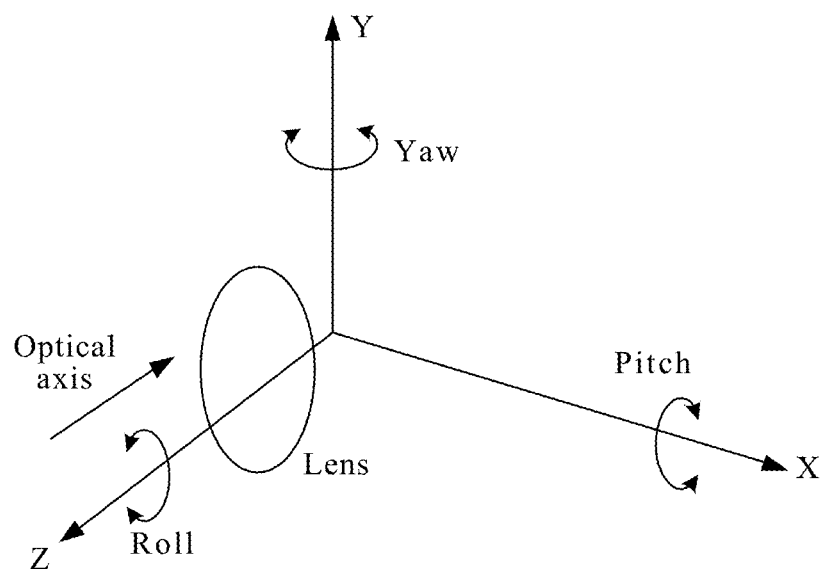
FIG. 1 is a schematic diagram of various shake of a video image according to an embodiment of this application.
Figure 2:
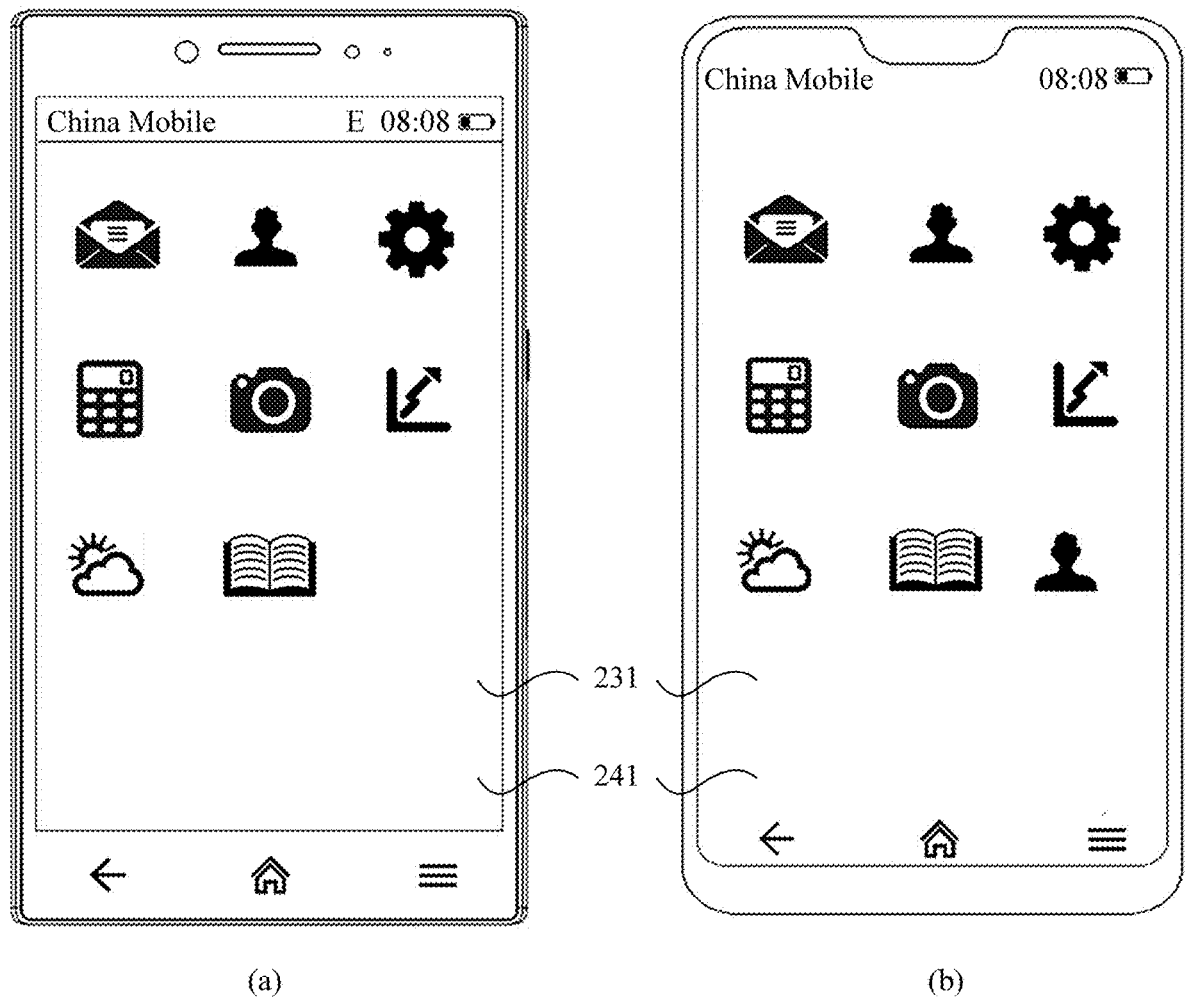
FIG. 2 is a schematic front view of a terminal according to an embodiment of this application.
Figure 3:
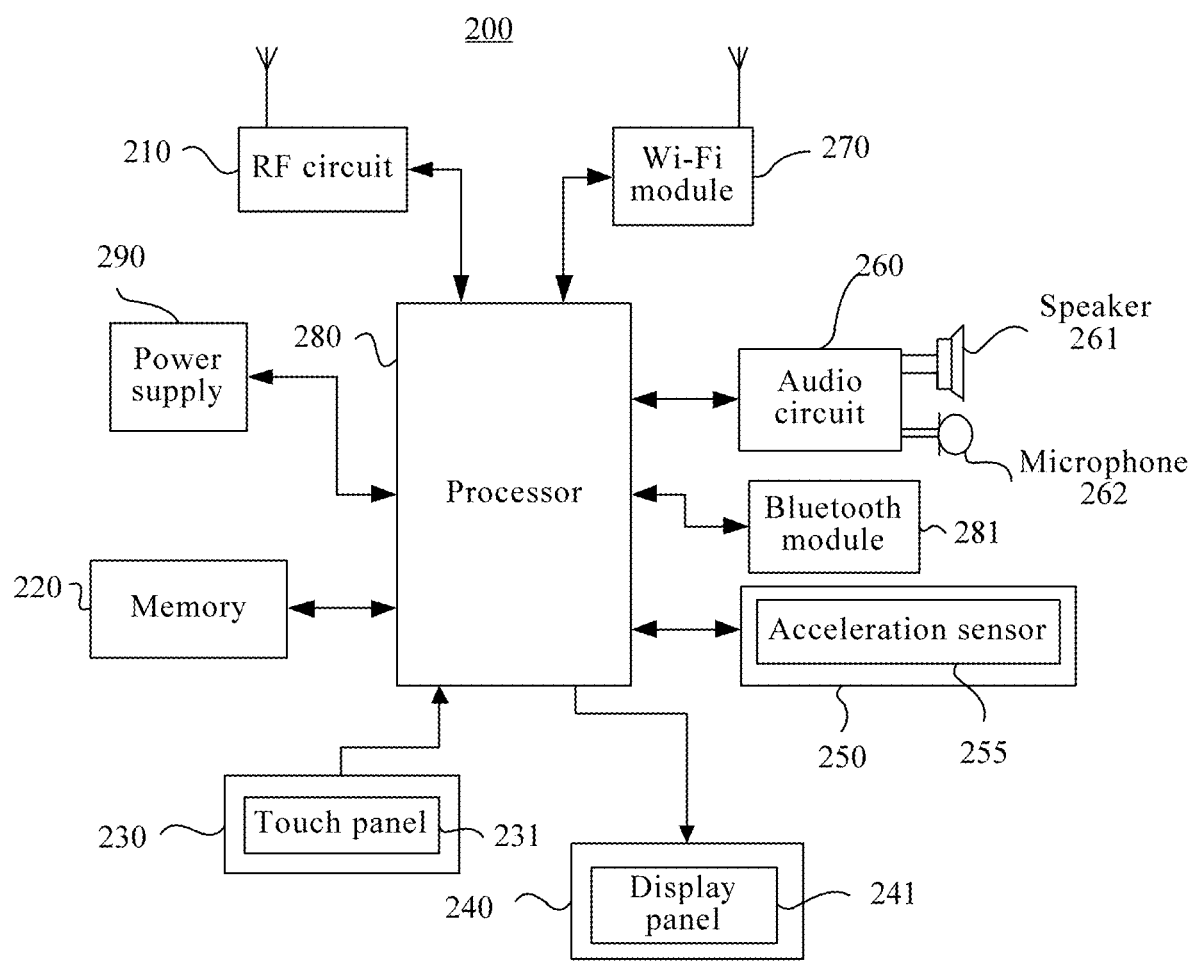
FIG. 3 is a schematic structural diagram 1 of a terminal according to an embodiment of this application.

The terminal in this embodiment of this application may be various electronic devices having a photographing function; for example, it may be a wearable electronic device (for example, a smartwatch), a tablet computer, a desktop computer, a virtual reality apparatus, an augmented reality apparatus, a camera, or a video camera, or may be the mobile phone 200 shown in FIG. 2 or FIG. 3. A specific form of the terminal is not limited in this embodiment of this application.

In the following embodiment, how the terminal implements a specific technical solution in the embodiment is described by using a phone as an example. As shown in FIG. 2 or FIG. 3, the terminal in the embodiments of this application may be the mobile phone 200. FIG. 2 is a schematic front view of a mobile phone 200. The mobile phone 200 may be, for example, a bezel-less screen shown in (a) in FIG. 2, or a notched bezel-less screen (which may also be referred to as an abnormal-shaped bezel-less screen) shown in (b) in FIG. 2. FIG. 3 is a schematic structural diagram of hardware of the mobile phone 200. It should be understood that the mobile phone 200 shown in the figure is merely an example of the terminal, and the mobile phone 200 may include more components or fewer components than those shown in the figure, or may combine two or more components, or may include different components.

As shown in FIG. 3, the mobile phone 200 may include components such as a radio frequency (RF) circuit 210, a memory 220, an input unit 230, a display unit 240, a sensor 250, an audio circuit 260, a wireless fidelity (Wi-Fi) module 270, a processor 280, a Bluetooth module 281, and a power supply 290.

The RF circuit 210 may be configured to receive and send a signal in an information receiving and sending process or a call process, may receive downlink information from a base station, then deliver the downlink information to the processor 280 for processing, and additionally, may send uplink data to the base station. Usually, the RF circuit includes but is not limited to devices such as an antenna, at least one amplifier, a transceiver, a coupler, a low noise amplifier, and a duplexer.

The memory 220 may be configured to store a software program and data. The processor 280 runs the software program and the data that are stored in the memory 220, to perform various functions and data processing of the mobile phone 200. The memory 220 may include a high speed random access memory, and may further include a non-volatile memory, such as at least one magnetic disk storage device, a flash storage device, or another volatile solid-state storage device. The memory 220 stores an operating system that can run on the mobile phone 200, for example, an iOS® operating system developed by Apple Inc, an Android® open source operating system developed by Google Inc, or a Windows® operating system developed by Microsoft Inc. The memory 220 in this application may store an operating system and various application software, and may further store code for performing the method in the embodiments of this application.

The input unit 230 (such as a touchscreen) may be configured to receive entered digit or character information, and generate a signal input related to a user setting and function control of the mobile phone 200. Specifically, the input unit 230 may include a touch panel 231, as shown in FIG. 2, disposed on a front surface of the mobile phone 200, and may collect a touch operation performed by a user on or near the touch panel 231. In this application, the input unit 230 may collect a touch control operation of the user.

The display unit 240 (namely, a display screen) may be configured to display information entered by the user or information provided to the user, and graphical user interfaces (GUI) of various menus of the mobile phone 200. The display unit 240 may include a display panel 241 disposed on the front surface of the mobile phone 200. The display panel 241 may be configured in a form of a liquid crystal display, an organic light-emitting diode, or the like. The display unit 240 may be configured to display various graphical user interfaces described in this application. The touch panel 231 may cover the display panel 241, or the touch panel 231 and the display panel 241 may be integrated to implement input and output functions of the mobile phone 200. The integrated panel may be referred to as a touch display screen for short. In this application, the display unit 240 may display a photographed video or the like.

The mobile phone 200 may further include at least one sensor 250, for example, an angle sensor, configured to detect a rotation motion of the device in an X direction, a Y direction, and a Z direction, and the angle sensor may be a gyroscope, another motion sensor, or the like; a displacement sensor, configured to detect translational shake of the device in the X direction, the Y direction, and the Z direction, and the displacement sensor may be an accelerometer, another motion sensor, or the like; a depth sensor, configured to detect an object distance in a photographing scenario, and the depth sensor may be a depth detection device such as a laser sensor, a time of flight (TOF) sensor, or structured light sensor; a location sensor, configured to detect a location (or referred to as an image distance) of a camera lens, and the location sensor may be a device that may detect the location of the camera lens such as a Hall effect sensor, an AMR, GMR, or TMR sensor; and an image sensor, configured to perform photoreception and generate an image, and the image sensor may be an optical image sensor such as a complementary metal oxide semiconductor (CMOS) or a charge coupled device (CCD) sensor. The mobile phone 200 may be further configured with another sensor such as a barometer, a hygrometer, a thermometer, or an infrared sensor.

The audio circuit 260, a speaker 261, and a microphone 262 may provide an audio interface between the user and the mobile phone 200. The audio circuit 260 may convert received audio data into an electrical signal and transmit the electrical signal to the speaker 261. The speaker 261 converts the electrical signal into a sound signal for output. On the other hand, the microphone 262 converts a collected sound signal into an electrical signal. The audio circuit 260 receives the electrical signal, converts the electrical signal into audio data, and then outputs the audio data to the RF circuit 210, to send the audio data to, for example, another mobile phone, or output the audio data to the memory 220 for further processing. In this application, the microphone 262 may collect audio synchronized with a video.

Wi-Fi is a short-distance wireless transmission technology. The phone 200 may help, by using the Wi-Fi module 270, the user to receive and send an email, browse a web page, access streaming media, and the like. The Wi-Fi provides wireless broadband Internet access for the user.

The processor 280 is a control center of the mobile phone 200, and is connected to various parts of the whole mobile phone by using various interfaces and lines. The processor 280 performs various functions and data processing of the mobile phone 200 by running or executing the software program stored in the memory 220, and invoking the data stored in the memory 220. In some embodiments, the processor 280 may include one or more processing units. The processor 280 may further integrate an application processor and a baseband processor. The application processor mainly processes an operating system, a user interface, an application program, and the like. The baseband processor mainly processes wireless communication. It may be understood that, the foregoing baseband processor may not be integrated in the processor 280. In this application, the processor 280 may include an image signal processor (ISP).

The Bluetooth module 281 is configured to exchange information with another Bluetooth device having a Bluetooth module by using a Bluetooth protocol. For example, the mobile phone 200 may establish, by using the Bluetooth module 281, a Bluetooth connection to a wearable electronic device (for example, a smartwatch) that also has a Bluetooth module, to exchange data.

The mobile phone 200 further includes the power supply 290 (such as a battery) that supplies power to the components. The power supply may be logically connected to the processor 280 by using a power management system, to implement functions such as charging, discharging, and power consumption management by using the power management system.

In a video photographing process of the terminal, image shake between frames may occur because the user holds the terminal or the user is moving. An anti-shake function of the terminal may be used to perform compensation on a video image that moves in a direction in an opposite direction of the direction, to eliminate the image shake between frames as much as possible.

Figure 4:
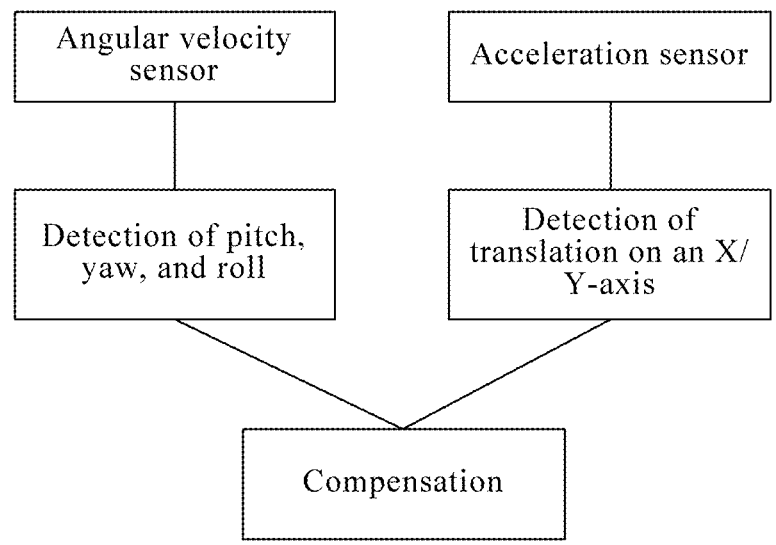
FIG. 4 is a schematic diagram of five-axis anti-shake of a video image according to an embodiment of this application.

Referring to FIG. 4, in the prior art, shake of a video in a five-axis direction can only be compensated for at most, and rotation shake such as pitch, yaw, and roll is detected by using an angular velocity sensor, in addition, the acceleration sensor detects the translational shake on the X-axis and the translational shake on the Y-axis, and finally obtains a compensation (anti-shake) result through synthesis. Currently, there is no good processing manner for the translational shake on the Z-axis, that is, shake along a front and back direction of an optical axis. In addition, currently, object distance information is not considered in compensation for the translational shake on the X-axis and the translational shake on the Y-axis, and the compensation effect is poor. In addition, when the terminal performs focus adjustment, because of a change of a location of a camera lens, an image in a video may also be zoomed in and out, and this factor may also adversely affect stability of the video image. It should be noted that the focus adjustment described in this application refers to adjusting an image distance, that is, adjusting a distance between the camera lens and an optical image sensor.

Figure 5:
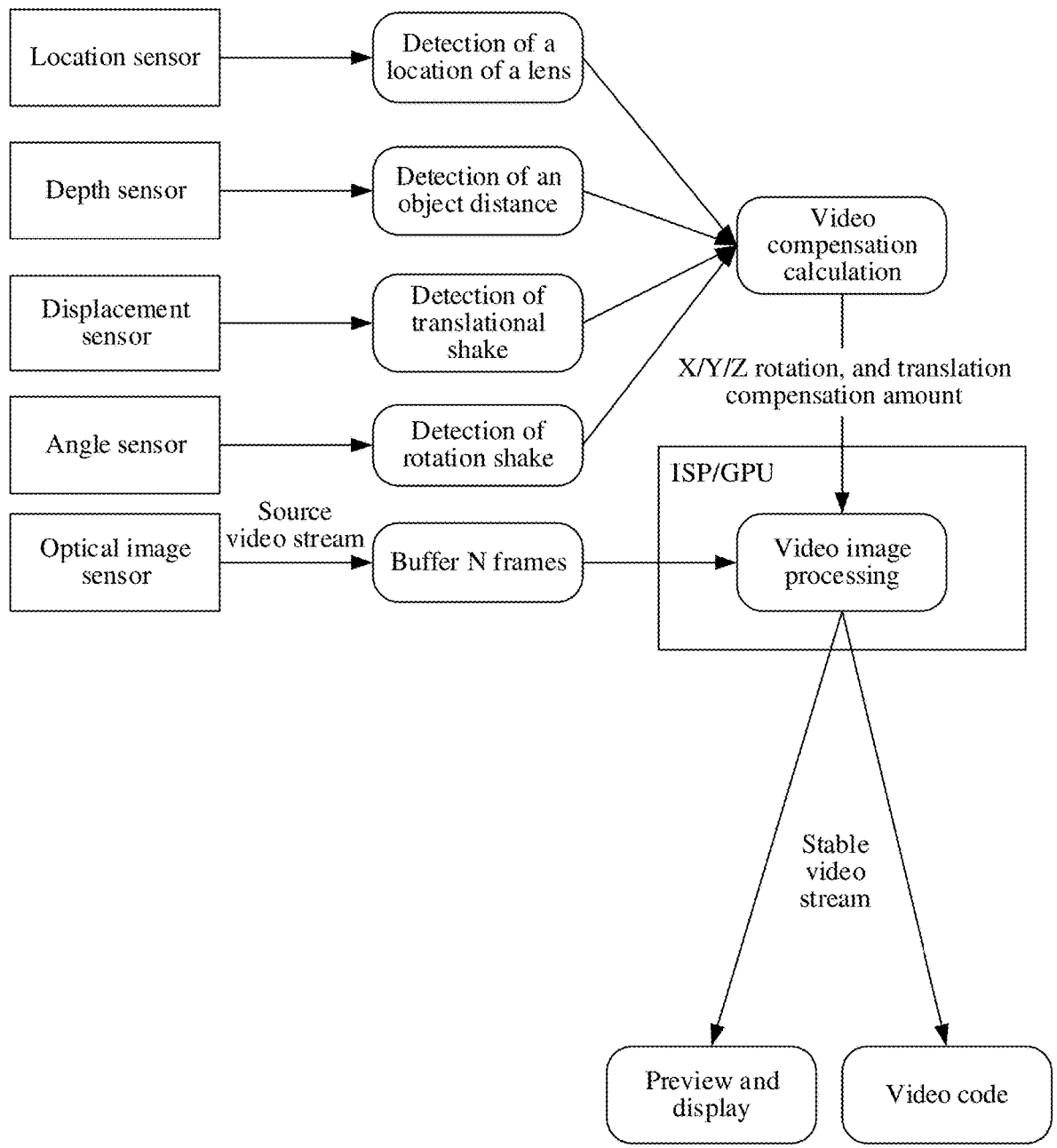
FIG. 5 is a schematic diagram of how each sensor performs a process according to an embodiment of this application.

Referring to FIG. 5, the terminal in this application performs detection of rotation shake by using an angle sensor, detection of translational shake by using a displacement sensor, detection of an object distance by using a depth sensor, and detection of a location of a camera lens by using a location sensor. A processor performs video compensation calculation based on a result of the foregoing detection, and obtains a rotation compensation amount on the X/Y/Z-axis and/or a translation compensation amount on the X/Y/Z-axis. After the terminal obtains a source video stream during the detection by using the optical image sensor, and buffers N frames of images of the source video stream, an image signal processor (ISP) or a graphic processing unit (GPU) performs video image processing with reference to the foregoing compensation amount and the source video stream, to obtain a stable video stream after the anti-shake processing, and then the stable video stream may be directly previewed and displayed on a display screen, may be used for video coding, or the like. In this application, the video image anti-shake function may be enabled or disabled by using a switch.

Figure 6:
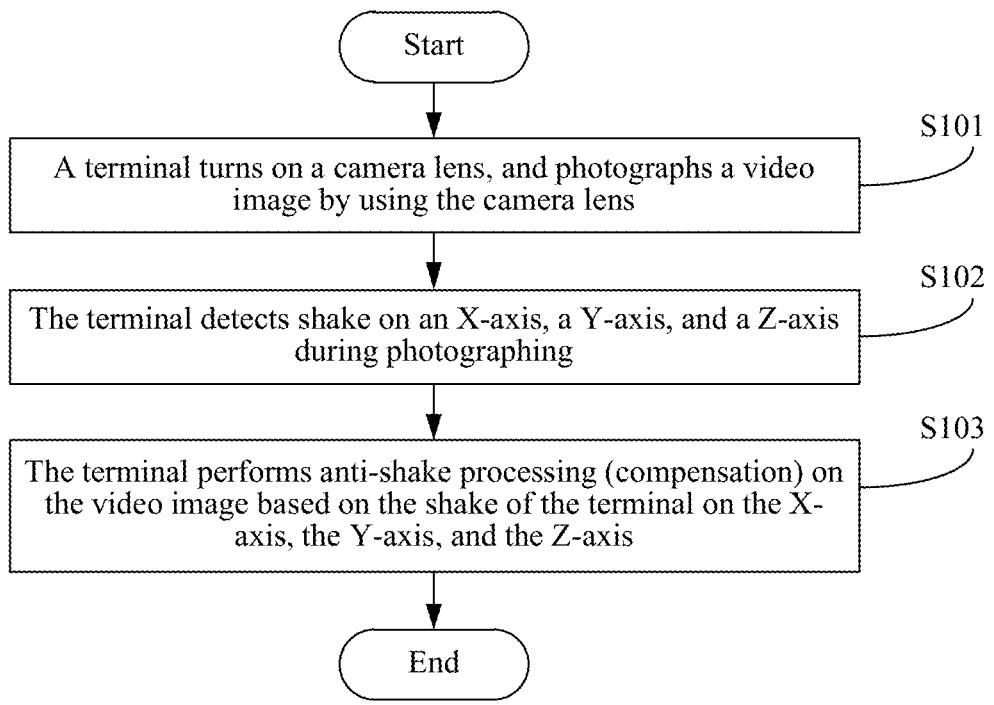
FIG. 6 is a schematic flowchart of a video image anti-shake method according to an embodiment of this application.

The following specifically describes, with reference to the accompanying drawings, the video image anti-shake method provided in the embodiments of this application. FIG. 6 is a schematic flowchart of a video image anti-shake method according to an embodiment of this application. The method specifically includes the following steps.

S101: A terminal turns on a camera lens, and photographs a video image by using the camera lens.

The terminal may open an application program that can photograph a video by using the camera lens, for example, a camera or WECHAT. The application program may be configured to: control the camera lens, and photograph a video by using an optical image sensor such as a CMOS or a CCD in the camera lens. The camera lens may be a front-facing camera or a rear-facing camera.

In a process in which the terminal shakes, video images collected by the optical image sensor in a previous frame and a next frame differ greatly, and this means that image shake occurs on a display screen Image data collected by the optical image sensor may be matrix pixel data, and resolution of a finally processed video stream may be less than resolution of the image data collected by the image sensor. This design may provide redundant data for image processing.

S102: The terminal detects shake on an X-axis, a Y-axis, and a Z-axis during photographing.

Step S102 and step S101 may be performed at the same time, so that shake data can correspond to the photographed video image when shake occurs on the terminal.

The terminal may detect three-axis shake of the terminal, that is, rotation shake on the X-axis, the Y-axis, and the Z-axis, including pitch, yaw, and roll. Alternatively, the terminal may detect six-axis shake of the terminal, that is, the rotation shake and translational shake on the X-axis, the Y-axis, and the Z-axis, including pitch, yaw, roll, translational shake on the X-axis, translational shake on the Y-axis, and translational shake on the Z-axis.

The Z-axis is an optical axis of the camera lens, the X-axis is an axis perpendicular to the Z-axis on a horizontal plane, the Y-axis is an axis perpendicular to the Z-axis on a vertical plane, the roll is rotation around the Z-axis, the pitch is rotation around the X-axis, and the yaw is rotation around the Y-axis.

Figure 7:
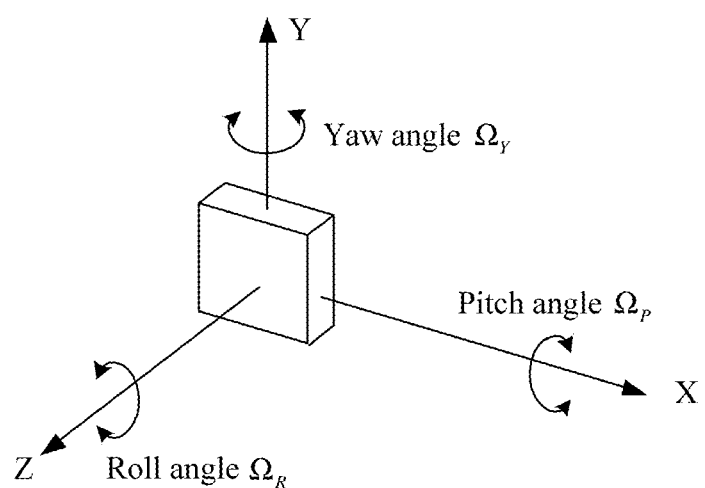
FIG. 7 is a schematic diagram of an angle sensor according to an embodiment of this application.

Specifically, the rotation shake of the terminal on the X-axis, the Y-axis, and the Z-axis may be detected by using an angle sensor. FIG. 7 is a schematic diagram of an angle sensor. The angle sensor may be a gyroscope or another motion sensor. The angle sensor may be installed on a body of a terminal, or may be installed in a camera lens module. If the angle sensor is a gyroscope, an output signal of the gyroscope is a moving angular velocity of the terminal. An angle, including a pitch angle $\Omega_R$, a yaw angle $\Omega_R$, and a roll angle $\Omega_p$, that the terminal rotates during a rotation motion may be obtained by performing integration on the output signal of the gyroscope once.

In modern electronic products, a micro electro mechanical system (MEMS) gyroscope is generally used to measure an angular velocity. The MEMS gyroscope uses the Coriolis force, which is the tangential force applied to a rotating object in a radial motion, to calculate the angular velocity. The MEMS gyroscope usually has movable capacitor boards in two directions. The capacitor boards measure capacitance changes caused by the movement of Coriolis. Because the Coriolis force is proportional to the angular velocity, the angular velocity may be calculated by a variation of the capacitance.

Figure 8:
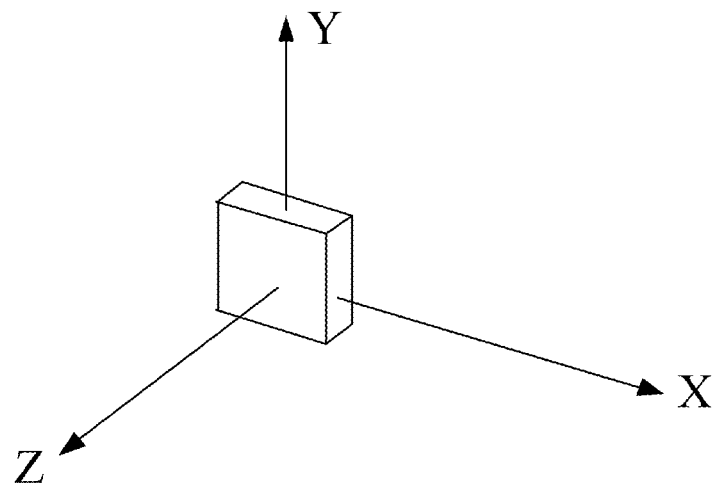
FIG. 8 is a schematic diagram of a displacement sensor according to an embodiment of this application.

Specifically, translational shake of the terminal on the X-axis, the Y-axis, and the Z-axis may be detected by using a displacement sensor. FIG. 8 is a schematic diagram of a displacement sensor. The displacement sensor may be an accelerometer or another motion sensor. The displacement sensor may be installed on a body of a device, or may be installed in a camera lens module. If the angle sensor is an acceleration sensor, an output signal of the acceleration sensor is an acceleration of the movement of the terminal. A linear velocity of the movement of the terminal may be obtained by performing integration on the output signal of the acceleration sensor once, a distance of the movement of the terminal may be obtained by performing the integration again on the linear velocity, and the distance includes translation distances of the terminal on the X-axis, the Y-axis, and the Z-axis.

In modern electronic products, an MEMS accelerometer includes a piezoelectric MEMS accelerometer, a capacitive MEMS accelerometer, and the like. The piezoelectric MEMS accelerometer uses a piezoelectric effect to calculate the acceleration. In the piezoelectric MEMS accelerometer, there is a mass block supported by a rigid body. When there is movement, the mass block generates pressure, the rigid body generates strain, and the acceleration is converted into an electrical signal for output. The capacitive MEMS accelerometer also has a mass block inside, while the mass block a standard flat-plate capacitor. The change of acceleration drives the movement of the mass block, thus changing a distance between two poles of the flat-plate capacitor and an area of overlap. The acceleration is calculated by measuring a capacitance variation.

In an actual product, the foregoing gyroscope and the accelerometer may be designed in a same electronic part and component, or may be separately designed as two independent electronic parts and components.

Anti-shake processing is performed on an image based on the foregoing sensor data, and only a basic anti-shake effect can be implemented. There are many other factors that may affect imaging quality. Therefore, this application further makes improvements in the following aspects.

Figure 9:
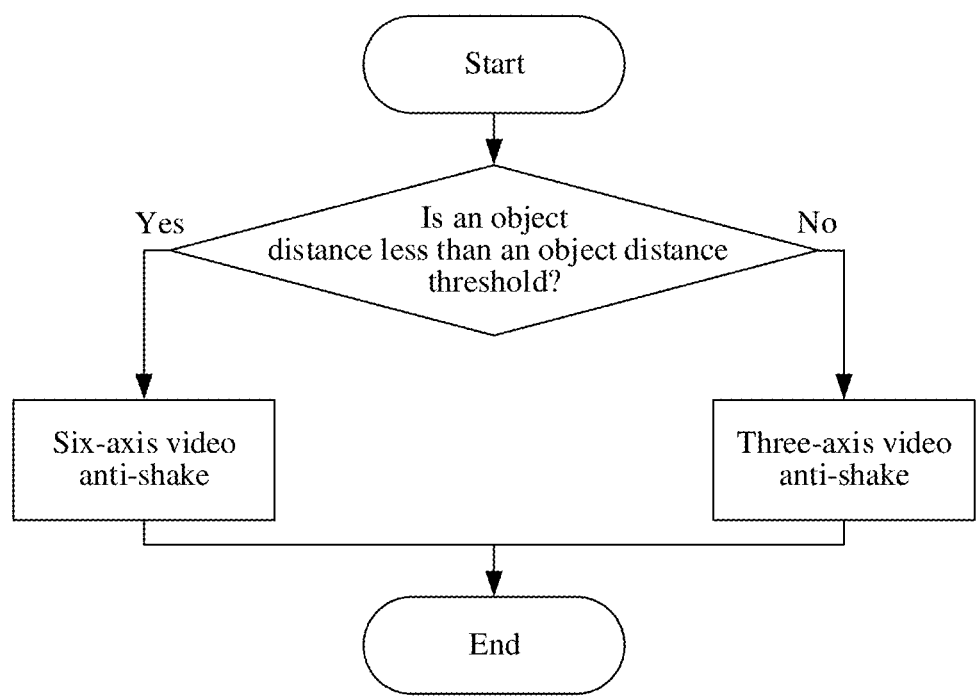
FIG. 9 is a schematic diagram of determining three-axis anti-shake or six-axis anti-shake based on an object distance according to an embodiment of this application.

In a daily use process, it may be found that when an object distance (a distance from a photographed object) is relatively far, translational shake of the terminal on the X-axis, the Y-axis, and the Z-axis has a relatively small impact on the image. When the object distance is relatively close, the translational shake of the terminal on the X-axis, the Y-axis, and the Z-axis has a great impact on the image. The object distance described in this application is a distance to a focused object or person. Therefore, referring to FIG. 9, the terminal may detect the object distance. If the object distance is greater than or equal to an object distance threshold, the terminal may only detect rotation shake (three-axis video anti-shake) of the terminal on the X-axis, the Y-axis, and the Z-axis, in this way, a data volume may be reduced, a data processing speed may be improved, and power consumption may be reduced; and if the object distance is less than the object distance threshold, the terminal may detect the rotation shake and translational shake (six-axis video anti-shake) of the terminal on the X-axis, the Y-axis, and the Z-axis, in this way, a relatively good anti-shake effect may be implemented.

Figure 10:
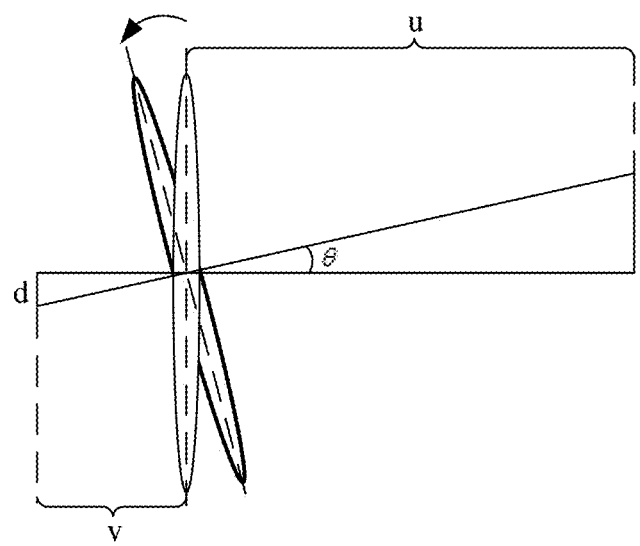
FIG. 10 is a schematic diagram of rotation (yaw) shake of a terminal around an X-axis or rotation (pitch) shake around a Y-axis according to an embodiment of this application.

In addition, referring to FIG. 10, according to a lens imaging principle, image shake caused by rotation (yaw) shake of the terminal around an X-axis or rotation (pitch) shake of the terminal around a Y-axis meets Formula 1: $d=v*\tan(\theta)$, where d is an image displacement distance, v is an image distance, and $\theta$ is a rotation angle around the X-axis or the Y-axis. It may be learned that the image shake generated when the terminal rotates around the X-axis or the Y-axis is irrelevant to the object distance u, and is related only to the image distance v and the rotation angle $\theta$ of the terminal. Therefore, a corresponding compensation amount is also related only to the image distance v and the rotation angle $\theta$.

Figure 11:
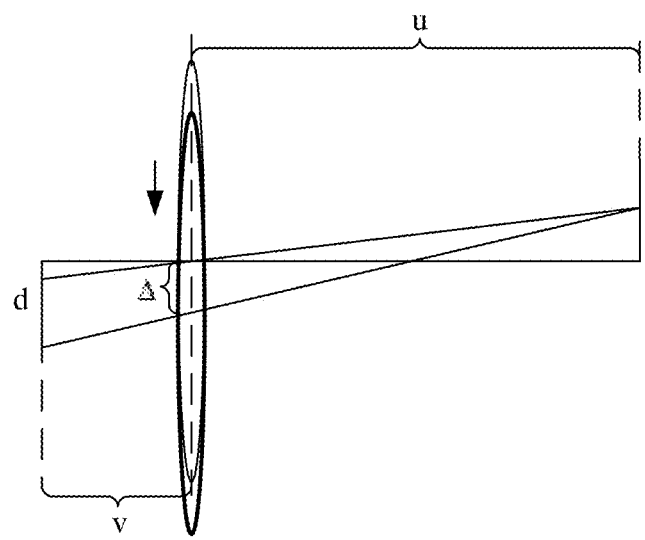
FIG. 11 is a schematic diagram of translational shake of a terminal on an X-axis or a Y-axis according to an embodiment of this application.

Referring to FIG. 11, according to a lens imaging principle, image shake caused by translational shake of the terminal on the X-axis or the Y-axis meets Formula 2: $d=(v+u)*\Delta/v$, where d is an image displacement distance, v is an image distance, u is an object distance, and $\Delta$ is a translation distance of the terminal on the X-axis or the Y-axis. It may be learned that the image shake caused by the translational shake of the terminal on the X-axis or the Y-axis is not only related to a translation distance $\Delta$ of the terminal, but also related to an image distance v and an object distance u. Therefore, a corresponding compensation amount is also related to the translation distance $\Delta$ of the terminal, the image distance v, and the object distance u.

Figure 12:
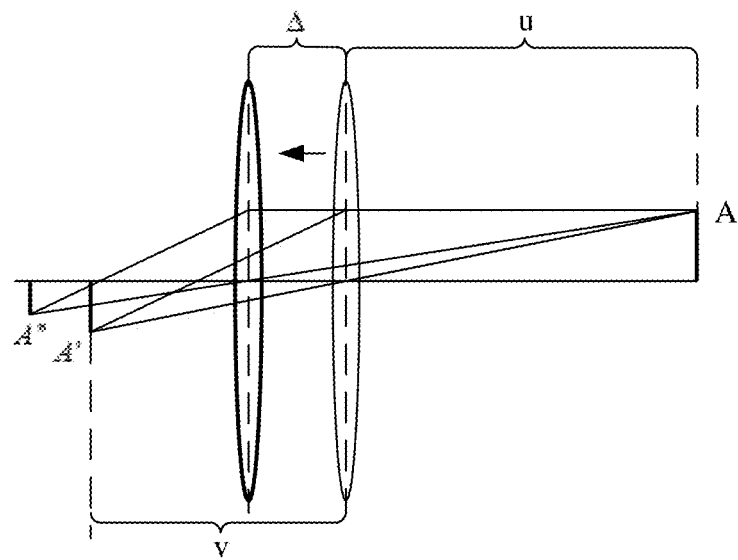
FIG. 12 is a schematic diagram of translational shake of a terminal on a Z-axis according to an embodiment of this application.

Referring to FIG. 12, for image shake caused by translational shake of the terminal on the Z-axis, assuming that an object height is A, before the terminal is translated along the Z-axis, an image height is A', an object distance is u, and an image distance is v. According to a lens imaging principle, $A/u=A'/v$. Therefore, $A'=vA/u$, the terminal translates a distance $\Delta$ in a direction away from an object on the Z-axis, so that the object distance u changes $\Delta$ while the image distance v remains unchanged. In this case, a translated image height is $A''=vA/(u+\Delta)$. Therefore, an image zoom ratio after the terminal translates along the Z-axis meets Formula 3: $r=A''/A'=u/(u+\Delta)$, and $\Delta$ may be a positive number or a negative number. It can be learned that, when the object distance increases, imaging becomes small, and when the object distance decreases, imaging becomes large.

In addition, the image shake caused by the translational shake of the terminal on the Z-axis is not only related to the translation distance Δ of the terminal, but also related to the object distance u, therefore, a corresponding compensation amount is also related to the translation distance Δ of the terminal and the object distance u.

Figure 13:
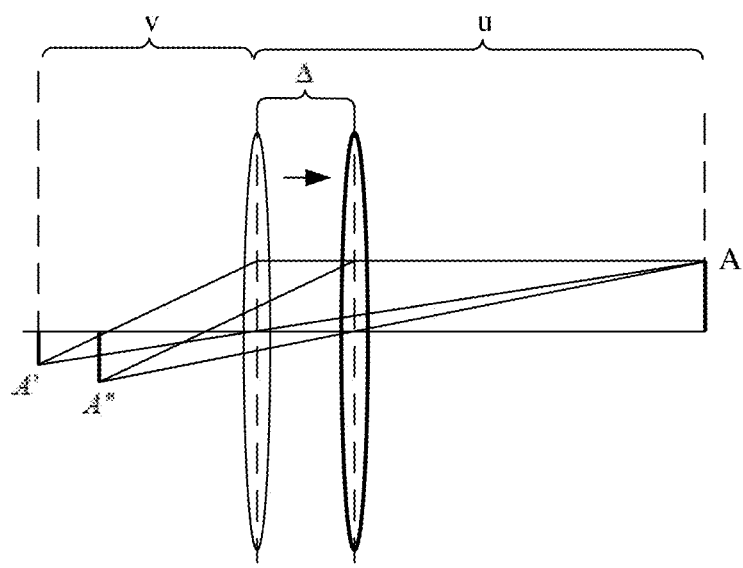
FIG. 13 is a schematic diagram of image shake caused by focus adjustment of a terminal according to an embodiment of this application.

Referring to FIG. 13, for image shake caused by focus adjustment of the terminal, assuming that a distance (that is, an image distance change distance) at which a lens of the terminal moves towards an object is Δ, the image distance changes to v+Δ, and the object distance changes to u−Δ, so that a new image height is A''=(v+Δ)A/(u−Δ). Therefore, an image zoom ratio after focus adjustment of the terminal meets Formula 4: =A''/A'=[(v+Δ)u]/[(u−Δ)v], where Δ may be a positive number or a negative number. It can be learned that the image shake caused by the focus adjustment of the terminal is related to a translation distance Δ of the lens, and is also related to an object distance u and an image distance v. Therefore, a corresponding compensation amount is also related to the translation distance Δ of the lens, the object distance u, and the image distance v.

In conclusion, because the image distance is a distance between the lens and the optical image sensor, the terminal not only needs to detect the rotation shake and the translational shake on the X-axis, the Y-axis, and the Z-axis, but also needs to detect a change of the object distance and a location of the lens.

Figure 14:
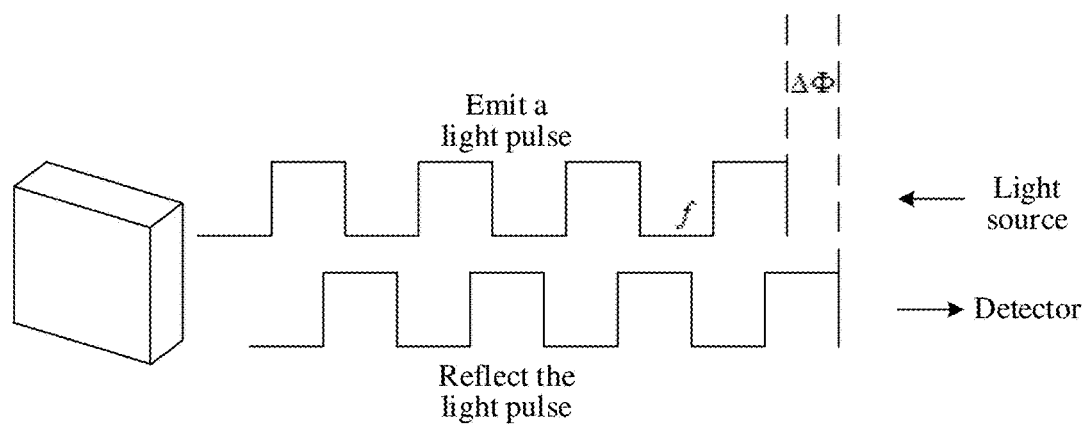
FIG. 14 is a schematic diagram of a TOF according to an embodiment of this application.

Specifically, the terminal may detect the object distance by using a depth sensor. The depth sensor may include at least one of the following sensors: a laser sensor, a TOF sensor, and a structured light sensor. The depth sensor may be installed on a body of a device, or may be installed in a camera lens module. The TOF continuously emits a light pulse to the photographed object, then receives, by using a sensor, a reflected light pulse returned from the object, and obtains an object distance by detecting flight (round-trip) time of emitting and receiving the light pulse. Referring to FIG. 14, an object distance $$b = \frac{c}{2} \frac{\Delta \Phi}{2\pi f}$$

may be calculated by detecting a phase difference Δϕ between emitted light and reflected light, a light velocity c, and a frequency of emitting the light pulse f.

Specifically, the terminal may detect a location (an image distance) of a lens by using a location sensor, to detect a focus adjustment motion of the lens, that is, a change status of the image distance. The location sensor may include at least one of the following sensors: devices that may detect the location of the lens such as a Hall effect sensor, an AMR sensor, a GMR sensor, or a TMR sensor.

Figure 15:
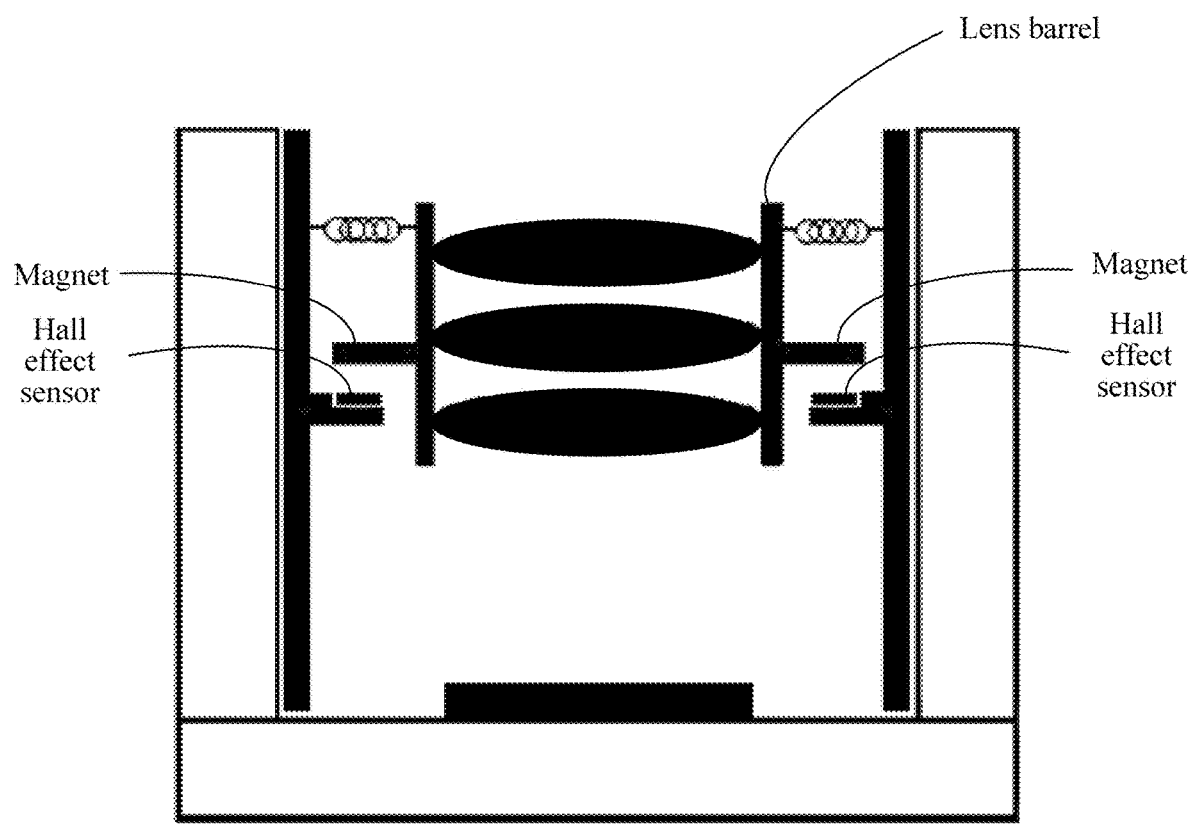
FIG. 15 is a schematic diagram of installation locations of a Hall magnet and a Hall effect sensor according to an embodiment of this application.

The Hall effect sensor is a location sensor made by using a Hall effect. When an electron in a Hall semiconductor material moves in an external magnetic field, a movement track is shifted because of a Lorentz force, and electric charge accumulation on two sides of the Hall semiconductor material is generated, to form an electric field perpendicular to a current direction, finally, the Lorentz force received by a carrier is balanced with electric field repulsion, so that a stable electric potential difference, that is, a Hall voltage, is established on two sides of the Hall semiconductor material. The magnetic field intensity may be calculated by measuring the Hall voltage, and a location of the Hall magnet may be calculated through the magnetic field intensity. In an actual product, referring to FIG. 15, a Hall magnet is usually installed on a lens barrel and moves with the movement of a lens. The Hall effect sensor is usually installed in a fixed location, for example, installed on a substrate. When focus adjustment is performed on the lens, an image distance changes, the location change of the lens drives the Hall magnet to move, and further changes the magnetic field intensity sensed by the Hall effect sensor, thereby causing a change of the Hall voltage. A quantity of a displacement of which the lens moves can be calculated by measuring a Hall voltage variation.

S103: The terminal performs anti-shake processing (compensation) on the video image based on the shake of the terminal on the X-axis, the Y-axis, and the Z-axis.

As described above, anti-shake processing is performed on an image based on sensor data detected by a displacement sensor or an angle sensor, which can only implement a basic anti-shake effect. This application further improves the anti-shake processing. Specifically, the terminal may perform the anti-shake processing on the video image based on the object distance, the image distance, and the shake of the terminal on the X-axis, the Y-axis, and the Z-axis.

Figure 16:
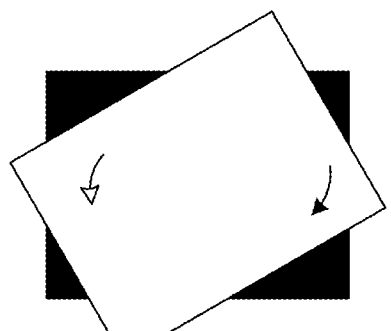
FIG. 16 is a schematic diagram of a basic principle of six-axis anti-shake for a video image according to an embodiment of this application.
Figure 16:
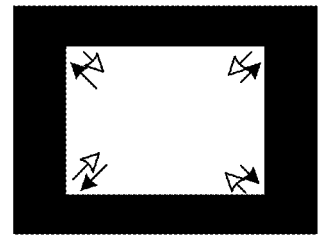
Figure 16:
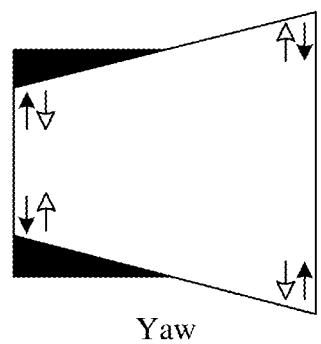
Figure 16:
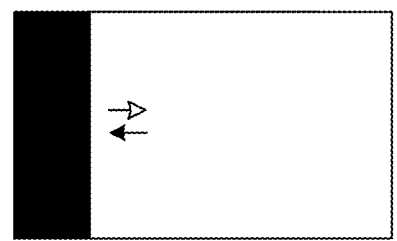
Figure 16:
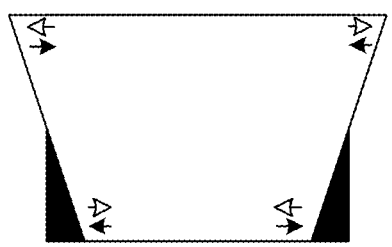
Figure 16:
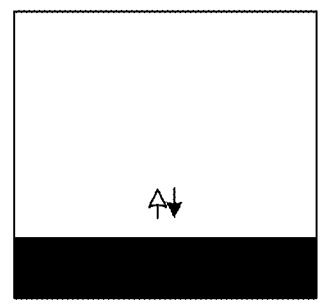
Figure 16:
Figure 16:
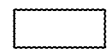
Figure 16:
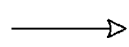
Figure 16:
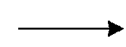

FIG. 16 shows a basic principle of six-axis anti-shake for a video image according to this application.

For image shake caused by rotation (roll) of the terminal around the Z-axis, the terminal may perform rotation compensation on the video image in an opposite direction and at a same angle of the rotation. For example, the roll shown in the figure is used as an example, assuming that the terminal rotates clockwise around the Z-axis by an angle α' and the photographed video image rotates counterclockwise by an angle α. In this case, the terminal needs to rotate the video image clockwise by an angle α to implement compensation.

For image shake caused by rotation (yaw) shake of the terminal around the X-axis or rotation (pitch) shake around the Y-axis, the terminal may perform, based on the formula 1, compensation on the video image with a same translation distance d in an opposite direction of translation of the video image, and restore trapezoidal distortion of the shaking video image to a rectangle in a rotation axis direction based on a trapezoidal correction algorithm. A specific trapezoidal correction algorithm may include image space transformation, an interpolation operation, and the like. Details are not described again. For example, the pitch shown in the figure is used as an example, assuming that the terminal rotates downward around the X-axis by an angle θ, so that the video image is translated d upward and trapezoidal distortion is presented in a horizontal direction. In the vertical direction, the terminal may perform compensation on the video image downward with a distance d with reference to content shown in FIG. 10 and the formula 1. In a horizontal direction, the terminal may restore the trapezoidal distortion to a rectangle by using the trapezoidal correction algorithm.

For image shake caused by translational shake of the terminal on the X-axis or the Y-axis, the terminal may perform, based on the formula 2, the compensation on the video image with the same translation distance d in an opposite direction of translation of the video image, and cropping a redundant part of the video image. For example, using the translational shake on the Y-axis shown in the figure as an example, assuming that the terminal translates downward along the Y-axis with a distance d, so that the video image translates upward along the Y-axis with a distance d, the terminal may perform compensation on the video image along the Y-axis downward with a distance d with reference to content shown in FIG. 11 and a corresponding formula 2, and crop the redundant part of an upper part of the video image.

For image shake caused by the translational shake of the terminal on the Z-axis, the terminal may zoom the video image based on a zoom ratio $(u+\Delta)/u$ (reciprocal of the formula 3), where u is the object distance, $\Delta$ is the translation distance of the terminal in a direction away from an object on the Z-axis, and $\Delta$ may be a positive number or a negative number. If the imaging of the object becomes large when the terminal approaches the photographed object, the terminal may zoom out the image based on the formula; and if the imaging of the object becomes small when the terminal is far away from the object, the terminal may zoom in the image based on the formula.

For image shake caused by focus adjustment of the terminal, the terminal may zoom the video image based on a zoom ratio $[(u-\Delta)v]/[(v+\Delta)u]$ (reciprocal of the formula 4), where u is the object distance, v is the image distance, and $\Delta$ is a distance by which the lens moves towards the object.

It should be noted that, the foregoing describes only the compensation manner for each shake case separately. In an actual use process, there may be a case in which multiple shakes may exist at the same time, and compensation may be performed only for the most obvious shake manner, or compensation may be performed for each shake; this is not limited in this application.

In this application, the video image on which the anti-shake processing is performed may be directly previewed and displayed on the display screen, or may be used for video coding or the like. This is not specifically limited.

According to the video image anti-shake method provided in this application, not only compensation for the translational shake of the terminal on the Z-axis may be implemented. A more accurate X/Y translational shake anti-shake effect may also be implemented by using object distance detection. In addition, an image zooming amount caused by focus adjustment is calculated by detecting a location of the lens, so that the image is stabilized during the focus adjustment through reverse zooming.

It may be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing terminal may be divided into functional modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, module division is exemplary, and is merely a logical function division. In actual implementation, another division manner may be used.

Figure 17:
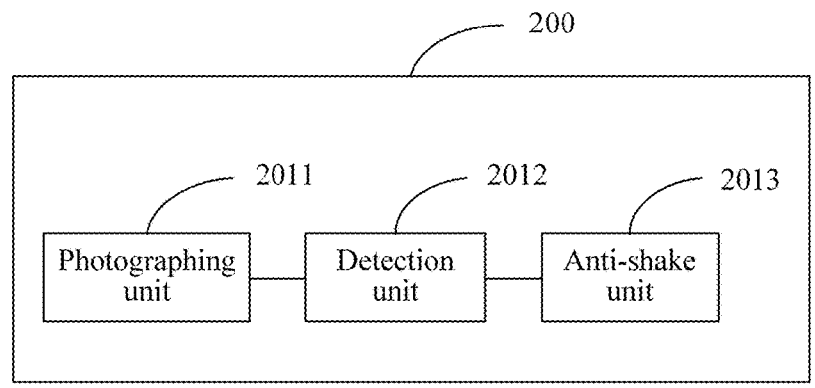
FIG. 17 is a schematic structural diagram 2 of a terminal according to an embodiment of this application.

When the functional modules are divided by using corresponding functions, FIG. 17 is a possible schematic structural diagram of a terminal according to the foregoing embodiment. The terminal 200 includes: a photographing unit 2011, a detection unit 2012, and an anti-shake unit 2013.

The photographing unit 2011 is configured to support the terminal 200 to perform the process S101 in FIG. 6. The detection unit 2012 is configured to support the terminal 200 to perform the process S102 in FIG. 6. The anti-shake unit 2013 is configured to support the terminal 200 to perform the process S103 in FIG. 6. All related content of the steps in the foregoing method embodiments may be cited in function descriptions of corresponding function modules. Details are not described herein again.

When an integrated unit is used, the foregoing photographing unit 2011 may be integrated into a photographing module, the detection unit 2012 may be integrated into a detection module, and the anti-shake unit 2013 may be integrated into a processing module. Certainly, the terminal may further include a storage module, a communications module, an input/output module, and the like.

Figure 18:
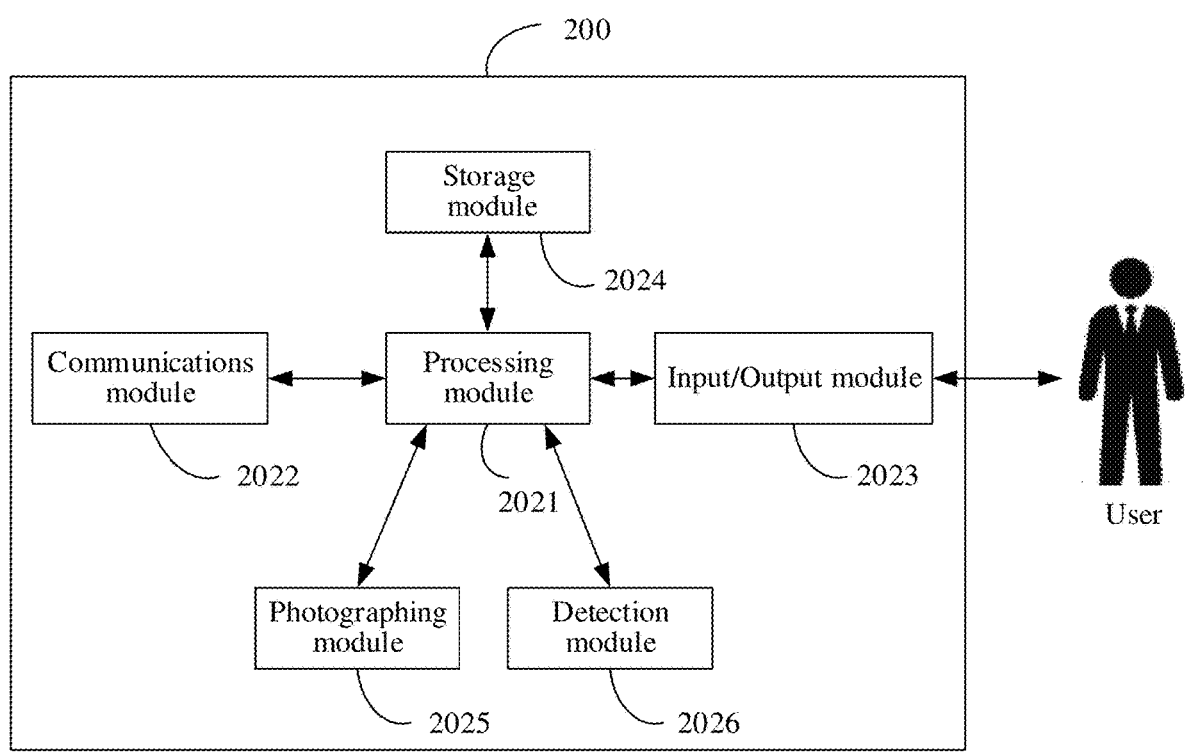
FIG. 18 is a schematic structural diagram 3 of a terminal according to an embodiment of this application.

In this case, FIG. 18 is a possible schematic structural diagram of the terminal in the foregoing embodiment. The processing module 2021 is configured to control and manage an operation of the terminal. The communications module 2022 is configured to support the terminal in communicating with another network entity such as a cloud server or another terminal. The input/output module 2023 is configured to receive information input by the user or output information provided for the user and various menus of the terminal. The storage module 2024 is configured to store program code and data that are of the terminal. The photographing module 2025 is configured to photograph a video image. The detection module 2026 is configured to detect shake of the terminal.

For example, the processing module 2021 may be a processor or a controller, for example, may be a central processing unit (CPU), a GPU, a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The communications module 2022 may be a transceiver, a transceiver circuit, an input/output device, a communications interface, or the like. For example, the communications module 2022 may specifically be a Bluetooth apparatus, a Wi-Fi apparatus, a peripheral interface, or the like.

The module 2024 may be a memory, the memory may include a high-speed random access memory (RAM), and may further include a non-volatile memory such as a magnetic disk storage device, a flash memory device, another volatile solid storage device, or the like.

The input/output module 2023 may be an input/output device such as a touchscreen, a keyboard, a microphone, or a display. The display may be specifically configured in a form of a liquid crystal display, an organic light-emitting diode, or the like. In addition, a touchpad may be further integrated into the display, and is configured to: collect a touch event on or near the touchpad, and send collected touch information to another component (such as the processor).

The photographing module 2025 may be an optical image sensor.

The detection module 2026 may include an angle sensor, a displacement sensor, a depth sensor, a location sensor, and the like.

When the storage module is a memory, the input/output module is a display, the processing module is a processor, and the communications module is a communications interface, the memory is configured to store a computer executable instruction, the processor is coupled to the memory, and when the terminal is run, the processor executes the computer executable instruction stored in the memory, so that the terminal performs the method according to any one of the accompanying drawings in FIG. 6.

The embodiments of the present invention further provide a computer storage medium storing one or more programs, the one or more programs include an instruction, and when the instruction is executed by a terminal, the terminal is enabled to perform the method according to any one of the accompanying drawings in FIG. 6.

The embodiments of the present invention further provide a computer program product including an instruction, when the computer program product is run on a terminal, the terminal is enabled to perform the method according to any one of the accompanying drawings in FIG. 6.

The terminal, computer storage medium, or computer program product provided in the embodiments of the present invention is configured to perform the corresponding method provided above. Therefore, for beneficial effects that can be achieved by the terminal, the computer storage medium, or the computer program product, refer to the beneficial effects in the corresponding method provided above. Details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely exemplary. For example, the unit division is merely a logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video image anti-shake method, comprising:
   turning on, by a terminal, a camera lens, and photographing a video image by using the camera lens;
   detecting, by the terminal, an object distance, wherein the object distance is a distance to a focused object or person;
   detecting, by the terminal, shake on an X-axis, a Y-axis, and a Z-axis during photographing, wherein the Z-axis is an optical axis of the camera lens, the X-axis is an axis perpendicular to the Z-axis on a horizontal plane, and the Y-axis is an axis perpendicular to the Z-axis on a vertical plane; and performing, by the terminal, anti-shake processing on the video image based on the shake on the X-axis, the Y-axis, and the Z-axis, wherein the anti-shake processing comprises video image processings;

wherein detecting, by the terminal, shake on an X-axis, a Y-axis, and a Z-axis comprises:

when the object distance is greater than or equal to an object distance threshold, detecting, by the terminal, rotation shake on the X-axis, the Y-axis, and the Z-axis; or when the object distance is less than an object distance threshold, detecting, by the terminal, rotation shake on the X-axis, the Y-axis, and the Z-axis, and detecting, by the terminal, translational shake on the X-axis, the Y-axis, and the Z-axis.

2. The method according to claim 1, wherein detecting, by the terminal, the object distance comprises:

detecting, by the terminal, the object distance by using a depth sensor, wherein the depth sensor comprises at least one of the following sensors: a laser sensor, a time of flight TOF sensor, and a structured light sensor.

3. The method according to claim 1, wherein detecting, by the terminal, the rotation shake on the X-axis, Y-axis, and Z-axis comprises:

detecting, by the terminal, the rotation shake on the X-axis, the Y-axis, and the Z-axis by using an angle sensor, wherein the angle sensor comprises a gyroscope.

4. The method according to claim 1, wherein detecting, by a terminal, the translational shake on the X-axis, Y-axis, and Z-axis comprises:

detecting, by the terminal, the translational shake on the X-axis, the Y-axis, and the Z-axis by using a displacement sensor, wherein the displacement sensor comprises an accelerometer.

5. The method according to claim 1, wherein the method further comprises: detecting, by the terminal, an image distance; and wherein performing, by the terminal, anti-shake processing on the video image based on the shake on the X-axis, the Y-axis, and the Z-axis comprises:

performing, by the terminal, anti-shake processing on the video image based on the object distance, the image distance, and the shake on the X-axis, the Y-axis, and the Z-axis.

6. The method according to claim 5, wherein detecting, by the terminal, the image distance comprises:

detecting, by the terminal, the image distance by using a location sensor, wherein the location sensor comprises at least one of the following sensors: a Hall effect sensor, an anisotropic magneto resistance (AMR) sensor, a giant magneto resistance (GMR) sensor, and a tunneling magneto resistance (TMR) sensor.

7. The method according to claim 5, wherein performing, by the terminal, the anti-shake processing on the video image based on the object distance, the image distance, and the shake on the X-axis, the Y-axis, and the Z-axis comprises:

for image shake caused by rotation of the terminal around the Z-axis, performing, by the terminal, rotation compensation on the video image in an opposite direction of the rotation and at a same angle of the rotation;

for image shake caused by rotation shake of the terminal around the X-axis or rotation shake around the Y-axis, performing, by the terminal based on a formula $d=v*\tan(\theta)$, compensation on the video image with a same translation distance d in an opposite direction of translation of the video image, and restoring trapezoidal distortion of the video image to a rectangle in a rotation axis direction based on a trapezoidal correction algorithm, wherein d is an image displacement distance, v is the image distance, and $\theta$ is an angle of rotation around the X-axis or the Y-axis; and for image shake caused by the translational shake of the terminal on the X-axis or the Y-axis, performing, by the terminal based on a formula $d=(v+u)*\Delta/v$, compensation on the video image with a same translation distance d in an opposite direction of translation of the video image, and cropping a redundant part of the video image, wherein d is an image displacement distance, v is the image distance, u is the object distance, and $\Delta$ is a translation distance of the terminal; and for image shake caused by the translational shake of the terminal on the Z-axis, zooming, by the terminal, the video image based on a zoom ratio $(u+\Delta)/u$, wherein u is the object distance, and $\Delta$ is a translation distance of the terminal in a direction away from an object on the Z-axis.

8. The method according to claim 5, wherein the method further comprises:

for image shake caused by focus adjustment of the terminal, zooming, by the terminal, the video image based on a zoom ratio $[(u-\Delta)v]/[(v+\Delta)u]$, wherein u is the object distance, v is the image distance, and $\Delta$ is a distance by which a lens moves towards the object.

9. A terminal, comprising: a processor, a display, a memory, and a communications interface; wherein the memory is configured to store a computer execution instruction, the processor is coupled to the memory, and when the terminal is run, the processor executes the computer execution instruction stored in the memory, so that the terminal performs the method comprising:

turning on, by the terminal, a camera lens, and photographing a video image by using the camera lens;

detecting, by the terminal, an object distance, wherein the object distance is a distance to a focused object or person;

detecting, by the terminal, shake on an X-axis, a Y-axis, and a Z-axis during photographing, wherein the Z-axis is an optical axis of the camera lens, the X-axis is an axis perpendicular to the Z-axis on a horizontal plane, and the Y-axis is an axis perpendicular to the Z-axis on a vertical plane; and performing, by the terminal, anti-shake processing on the video image based on the shake on the X-axis, the Y-axis, and the Z-axis, wherein the anti-shake processing comprises video image processings;

wherein detecting, by the terminal, the shake on the X-axis, the Y-axis, and the Z-axis comprises:

when the object distance is greater than or equal to an object distance threshold, detecting, by the terminal, rotation shake on the X-axis, the Y-axis, and the Z-axis; or when the object distance is less than an object distance threshold, detecting, by the terminal, rotation shake on the X-axis, the Y-axis, and the Z-axis, and detecting, by the terminal, translational shake on the X-axis, the Y-axis, and the Z-axis.

10. The terminal according to claim 9, wherein detecting, by the terminal, the object distance comprises:

detecting, by the terminal, the object distance by using a depth sensor, wherein the depth sensor comprises at least one of the following sensors: a laser sensor, a time of flight TOF sensor, and a structured light sensor.

11. The terminal according to claim 9, wherein detecting, by the terminal, the rotation shake on the X-axis, Y-axis, and Z-axis comprises:
detecting, by the terminal, the rotation shake on the X-axis, the Y-axis, and the Z-axis by using an angle sensor, wherein the angle sensor comprises a gyroscope.

12. The terminal according to claim 9, wherein detecting, by the terminal, the translational shake on the X-axis, Y-axis, and Z-axis comprises:
detecting, by the terminal, the translational shake on the X-axis, the Y-axis, and the Z-axis by using a displacement sensor, wherein the displacement sensor comprises an accelerometer.

13. The terminal according to claim 9, wherein
the method further comprises: detecting, by the terminal, an image distance; and
wherein performing, by the terminal, anti-shake processing on the video image based on the shake on the X-axis, the Y-axis, and the Z-axis comprises:
performing, by the terminal, anti-shake processing on the video image based on the object distance, the image distance, and the shake on the X-axis, the Y-axis, and the Z-axis.

14. The terminal according to claim 13, wherein detecting, by the terminal, the image distance comprises:
detecting, by the terminal, the image distance by using a location sensor, wherein the location sensor comprises at least one of the following sensors: a Hall effect sensor, an anisotropic magneto resistance (AMR) sensor, a giant magneto resistance (GMR) sensor, and a tunneling magneto resistance (TMR) sensor.

15. The terminal according to claim 13, wherein performing, by the terminal, the anti-shake processing on the video image based on the object distance, the image distance, and the shake on the X-axis, the Y-axis, and the Z-axis comprises:
for image shake caused by rotation of the terminal around the Z-axis, performing, by the terminal, rotation compensation on the video image in an opposite direction of the rotation and at a same angle of the rotation;
for image shake caused by rotation shake of the terminal around the X-axis or rotation shake around the Y-axis, performing, by the terminal based on a formula $d=v*\tan(\theta)$, compensation on the video image with a same translation distance d in an opposite direction of translation of the video image, and restoring trapezoidal distortion of the video image to a rectangle in a rotation axis direction based on a trapezoidal correction algorithm, wherein d is an image displacement distance, v is the image distance, and $\theta$ is an angle of rotation around the X-axis or the Y-axis; and for image shake caused by the translational shake of the terminal on the X-axis or the Y-axis, performing, by the terminal based on a formula $d=(v+u)*\Delta/v$, compensation on the video image with a same translation distance d in an opposite direction of translation of the video image, and cropping a redundant part of the video image, wherein d is an image displacement distance, v is the image distance, u is the object distance, and $\Delta$ is a translation distance of the terminal; and
for image shake caused by the translational shake of the terminal on the Z-axis, zooming, by the terminal, the video image based on a zoom ratio $(u+\Delta)/u$, wherein u is the object distance, and $\Delta$ is a translation distance of the terminal in a direction away from an object on the Z-axis.

16. The terminal according to claim 13, wherein the method further comprises:
for image shake caused by focus adjustment of the terminal, zooming, by the terminal, the video image based on a zoom ratio $[(u-\Delta)v]/[(v+\Delta)u]$, wherein u is the object distance, v is the image distance, and $\Delta$ is a distance by which a lens moves towards the object.

17. A non-transitory computer-readable storage medium, wherein the non-transitory computer-readable storage medium stores an instruction, and when the instruction is run on a terminal, the terminal is enabled to perform the method:
turning on, by the terminal, a camera lens, and photographing a video image by using the camera lens;
detecting, by the terminal, an object distance, wherein the object distance is a distance to a focused object or person;
detecting, by the terminal, shake on an X-axis, a Y-axis, and a Z-axis during photographing, wherein the Z-axis is an optical axis of the camera lens, the X-axis is an axis perpendicular to the Z-axis on a horizontal plane, and the Y-axis is an axis perpendicular to the Z-axis on a vertical plane; and
performing, by the terminal, anti-shake processing on the video image based on the shake on the X-axis, the Y-axis, and the Z-axis, wherein the anti-shake processing comprises video image processings;
wherein detecting, by the terminal, the shake on the X-axis, the Y-axis, and the Z-axis comprises:
when the object distance is greater than or equal to an object distance threshold, detecting, by the terminal, rotation shake on the X-axis, the Y-axis, and the Z-axis; or when the object distance is less than an object distance threshold, detecting, by the terminal, rotation shake on the X-axis, the Y-axis, and the Z-axis, and detecting, by the terminal, translational shake on the X-axis, the Y-axis, and the Z-axis.

* * * * *

UNITED STATES PATENT AND TRADEMARK OFFICE
CERTIFICATE OF CORRECTION

PATENT NO. : 11,539,887 B2
APPLICATION NO. : 16/976820
DATED : December 27, 2022
INVENTOR(S) : Yuanyou Li et al.

It is certified that error appears in the above-identified patent and that said Letters Patent is hereby corrected as shown below:

In the Claims

Column 17, Claim 1 please remove "processings" and replace with "processing" on the fourth word of Line 7.

Column 18, Claim 9 please remove "processings" and replace with "processing" on the fourth word of Line 53.

Column 20, Claim 17 please remove "processings" and replace with "processing" on the fourth word of Line 43.

Signed and Sealed this
Fourteenth Day of March, 2023

Katherine Kelly Vidal
*Director of the United States Patent and Trademark Office*